United States Patent [19]

Sheldon

[11] Patent Number: 5,230,259
[45] Date of Patent: Jul. 27, 1993

[54] METHOD OF MAKING A SURFACE WITH A SHARP EDGE

[75] Inventor: Robert G. Sheldon, Marietta, Ga.

[73] Assignee: Loockheed Corporation, Calabasas, Calif.

[21] Appl. No.: 787,844

[22] Filed: Nov. 4, 1991

[51] Int. Cl.$^5$ ............................................. B21D 47/04
[52] U.S. Cl. ................................. 76/101.1; 76/107.1; 76/DIG. 6; 428/636; 428/687
[58] Field of Search ............ 76/101.1, 107.1, DIG. 6; 428/182, 636, 637, 638, 639, 687, 599; 228/190

[56] References Cited

U.S. PATENT DOCUMENTS 2,056,491 10/1936 Stimson .......................... 76/DIG. 6
3,461,748 8/1969 Meyer ................................ 76/101.1

Primary Examiner—Roscoe V. Parker
Attorney, Agent, or Firm—Eric R. Katz

[57] ABSTRACT

A method of making a structure having a plurality of serrations on a surface is provided wherein each serration is positioned at a specific location along the surface, has first and second sides with specific lengths, and has effectively zero radius internal and external corners. In detail, the method comprising the steps of: providing a plurality of sheets of material having opposed principal surfaces, each said sheet having a thickness equal to the specific thickness of one of the first sides of the serrations; stacking said plurality of sheets of material in a staggered relationship such that said thicknesses of said sheets of material are in an order corresponding to the order of the first sides of the serrations and the distance between the ends of the adjacent ends of said sheets of material are in an order corresponding to the second sides of the serrations; and joining said stacked plurality of sheets of material together forming a joined stack with at least one end having a serrated surface thereon.

7 Claims, 4 Drawing Sheets

METHOD OF MAKING A SURFACE WITH A SHARP EDGE

BACKGROUND OF THE INVENTION

1. Field of the Invention

The invention generally relates to a method of making a serrated surface and more particularly to a method of making serrations having sharp edges.

2. Description of Related Art

There are numerous applications for the use of serrated surfaces on both flat and curved surfaces. Although such serrated structures are simple, making them using normal fabrication techniques, such as machining the serrations into the surface or casting or other conventional molding techniques, will not suffice because there are certain applications where the efficiency of operation of a serrated surface is highly dependent on having sharp corners between the serrations. For example, as little as a 0.001 inch radius can degrade the performance by some twenty-five percent. Thus, the above conventional techniques will not work well.

SUMMARY OF THE INVENTION

Accordingly, it is an object of the present invention to provide a method of making a serrated surface.

It is another object of the present invention to provide a method of making a serrated surface for use in manufacturing the structure within a duct as well as on an external surface.

The invention is a method of making a serrated surface wherein the surface comprises a plurality of sawtooth-like serrations. The efficiency of the surface is vastly improved when the serrations have sharp edges or points, the angle between the adjacent sides of serrations or sets of serrations are at a ninety degree angle to each other, and there is a zero to very small radius in the valleys between and at the peaks of the serrations. All surfaces comprising the serrated surface preferably have an extremely smooth surface finish, and which can be then coated with coating. The thickness of this coating can be on the order of 0.0005 inch or less.

In general terms, if the serrated surface is to be made of metal, the process involves the making of the serrated surface from metal sheet or foil stock (hereinafter only sheet stock is referred to) joined together by diffusion bonding. For example, individual sheets are laid up on a mold or platen (hereinafter only a platen will be referred to) having a forming surface conforming to the contour of the desired serrated surface configuration and a side wall inclined at an angle to the forming surface corresponding to the slope of one side of the serrations. The actual angle of the inclined surface will be a function of the type and size of serrated surface, which may differ markedly from when the surface is flat or used as a liner for a circular duct wall. The stack of sheets is positioned on the platen with the bottom thereof resting on the forming surface and one side butted against the inclined surface and, therefore, the top surface of the stack will be offset angularly from the bottom surface. Thus, the top surface of the stack has a serrated like surface because the individual sheets are in a staggered relationship, which, as previously mentioned, is a function of the angle of the inclined surface and the thickness of the individual sheets. Thus, the stagger between the sheets and the thickness thereof correspond to the parameters setting the sides of the individual serrations.

It is necessary to accurately position the individual sheets in the stack, because the serrations are typically very small and, thus, the individual sheets are correspondingly thin. However, because the sheets are very thin, they can be laid up using automated tape laying machines drawing the sheet stock from spools. After each sheet is laid down, it can be tack-welded in place to the preceding sheet and cut.

Other well known methods can be used; it is only important that the sheets be accurately positioned and do not move during the subsequent diffusion bonding step. A coating of material to prevent diffusion bonding is applied to the forming and inclined surfaces of the platen if required (prior to the lay-up of the sheets) and to the top surface of the stack, commonly called a "stop-off" coating. A typical stop-off coating is made from Boron Nitride and many such coatings are commercially available. A second stack can be thereafter laid up and coated in a similar fashion with the top staggered or serrated surface of the first stack acting as a guide.

Thereafter, the platen, with the assembled stacks thereon, is placed within a metal foil bag and sealed therein. A vacuum is drawn from the interior of the bag and the assembly is placed in an autoclave wherein the pressure and temperature are raised to a level where diffusion bonding takes place. The temperature and pressure are thereafter returned to ambient and the bag is opened. Of course, other conventional diffusion bonding techniques can be used, such as placing the platen and stack assembly in a heated press. After the stacks have been diffusion bonded they are separated and trimmed to shape.

Since the surface is typically joined to other structures, the bottom surface (side opposite the serrations) can be trimmed so that it is parallel to a plane passing through the edges or points of the serrations. However, sometimes the bottom surface of the stack in direct contact with the platen surface becomes sufficiently flat during the step of diffusion bonding. Additional dissimilar metal platens can be inserted with the stack to yield additional sheets with flat second sides. Most often the diffusion bonded stacks are joined together to form segments of complex structures such as the top, bottom and sides of rectangular ducts. The joining may be accomplished by a wide variety of processes, for example, electron beam or laser welding, or brazing before trimming.

As previously discussed, the serrated surface envisioned in accordance with the present invention can be made by varying the serrations along a duct. However, joining stacks with different staggers and thicknesses, via tapered shims, while not providing continuous variation along a surface of a duct, can achieve near optimal performance. Thus, one diffusion bonded stack can be joined to another stack via a tapered shim or a simple butt weld. Of course, the shims can be incorporated into the stacks during the step of diffusion bonding.

For example, as the stack is assembled from individual sheets, a tapered shim can be inserted at various locations along the stack. After each shim the thickness of the sheets can be appropriately changed. By adding additional shims and varying the thickness of the sheets, almost continuously varying serrations can be formed.

It must also be noted that curved diffusion bonded stacks can be fabricated using this process, which can be subsequently joined together to form circular shaped ducts or surfaces. In this instance, a platen is used having a curved forming surface. Such a stack can also incorporate tapered shims so that the serrations can be varied along the length of the stack. The steps of diffusion bonding, trimming and joining the diffusion bonded stacks together, are similar to the previous examples.

However, in the case of developing curved stacks the individual sheets must be simply curved to the shaped of the duct wall, because when assembled, they are at a fixed angle relative to the longitudinal axis of the duct at all circumferential locations. Fortunately, it is a simple matter to form the sheets to the required curvature. Of course, because the flat diffusion bonded stacks are very thin, it is a simple matter to form them into curved panels by conventional forming techniques. It has been found that hydro-forming with water is particularly effective because no damage to the serrations occurs.

While the above process has been directed at a method of making metal serrated surfaces by diffusion bonding, the process can easily be adapted to non-metallic materials such as ceramic or organic resin composites. For example, if the sheets were composite materials, they could be coated with an adhesive prior to stacking. After stacking, conventional vacuum bag-/autoclave forming techniques could be employed to cure the adhesive at temperature and under pressure. However, care must be taken to insure that the adhesive does not "run out" between the sheets, eliminating the necessary small allowable radius in the valleys between serrations. Of course, if the surfaces are not required to withstand extremely high temperatures, an adhesive could also be used with metal sheets.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

DESCRIPTION OF THE PREFERRED EMBODIMENT

Figure 1:
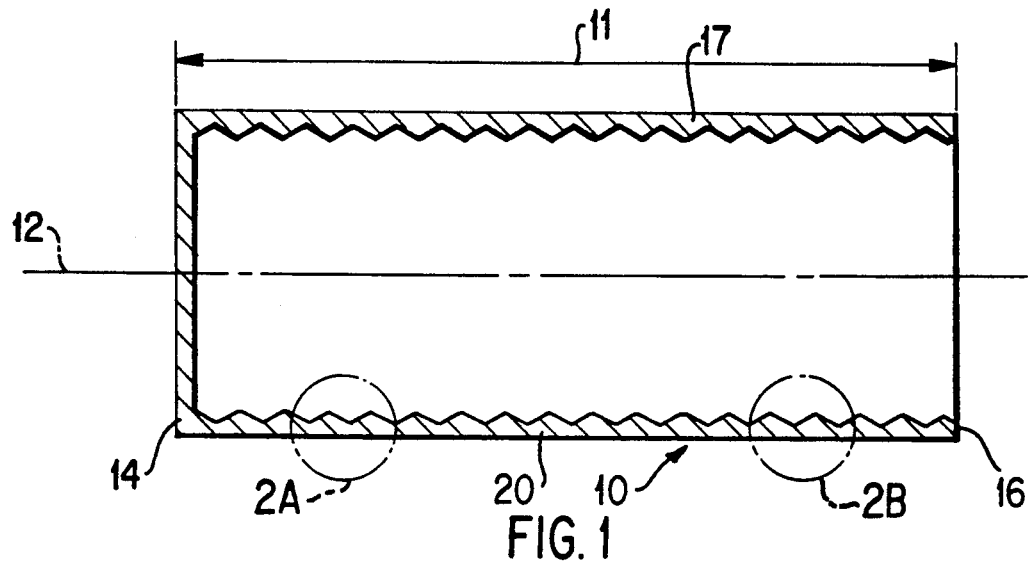
FIG. 1 is a cross-sectional view of a cavity in the form of a cylinder having a closed off first end and an open second end.

Referring to FIGS. 1 and 2, a duct or cavity is illustrated in the form of a cylinder with a circular crosssection, generally indicated by numeral 10, having an overall length 11, a longitudinal axis 12, a closed off forward end 14, an open rearwardly located end 16, and an interior cavity wall 17. The duct further has a plurality of circumferential saw-tooth-like serrations 20 lining the interior wall 17 thereof.

Figure 2A:
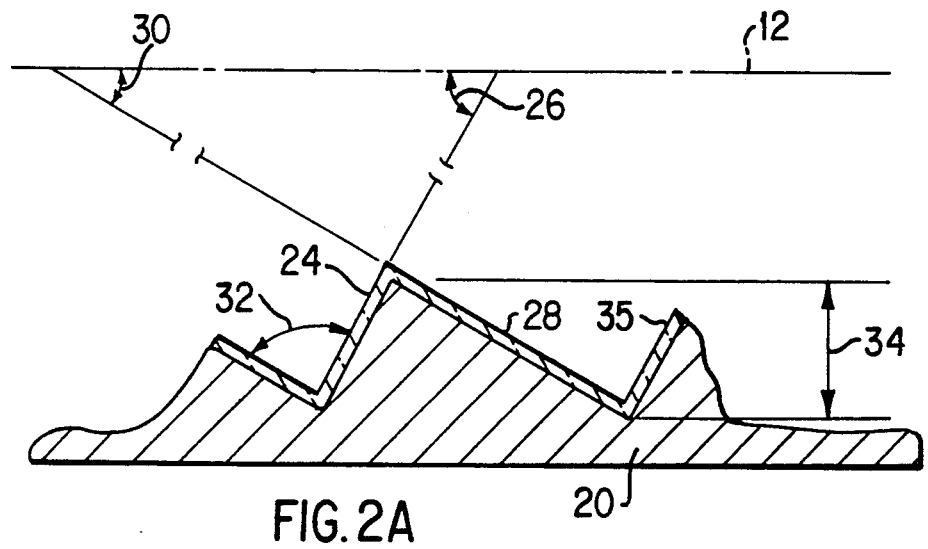
FIG. 2A is an enlarged view of a portion of the wall of the cavity shown in FIG. 1 enclosed within the circle, indicated by numeral 2A.

Referring particularly to FIG. 2A, it can be seen that each serration 20 includes a forward facing surface 24 having an angle to the longitudinal axis 12, indicated by numeral 26, and a rearward facing surface, indicated by numeral 28, having an angle to the longitudinal axis 12 indicated by numeral 30. The included angle between the two surfaces 24 and 28, indicated by numeral 32 is preferably always ninety degrees. The height of the serration is indicated by numeral 34. Preferably the angles 26 and 30 of the surfaces 24 and 28, respectively, vary along the length 11 of the cavity 10.

Figure 2B:
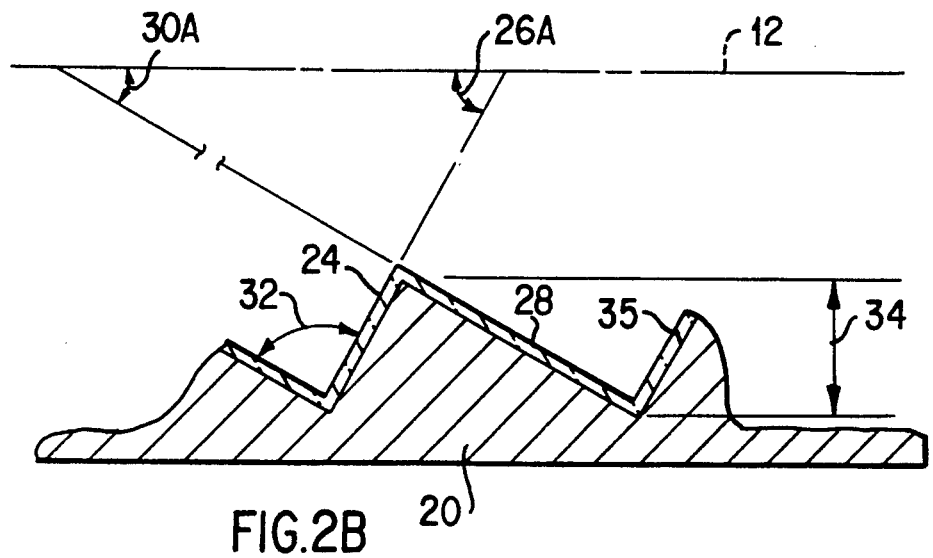
FIG. 2B is an enlarged view of a portion of the wall of the cavity shown in FIG. 1 enclosed within the circle, indicated by numeral 2B.

At a point near the rearward end 16, as illustrated in FIG. 2B, the forward and rearward facing surfaces 24 and 28, would have different angles to the longitudinal axis, indicated by numerals 26A and 30A, respectively. However, the included angle 32 and height 34 would remain the same. Finally, the surfaces 24 and 28 can be covered with a coating 35. Typically, such coatings have a thickness of around 0.0005 inch thick.

Figure 3:
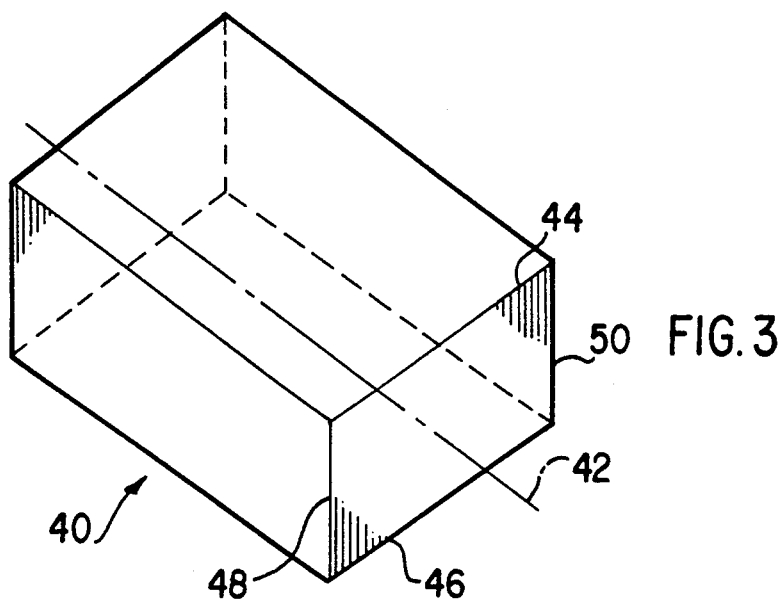
FIG. 3 is a perspective view of a rectangular shaped duct.

Illustrated in FIG. 3 is a perspective view of a duct having a rectangular cross-section, generally designated by numeral 40. The duct 40 has a longitudinal axis 42 and includes top and bottom surfaces 44 and 46, respectively, and side surfaces 48 and 50. Such a duct could also incorporate the serrations but some loss in efficiency in the corners would be experienced; however, in most cases, the losses in efficiency would be acceptable. As previously mentioned, the need for very sharp edges on the individual serrations and less than 0.0005 radius requirements for the "valleys" therebetween eliminates the more conventional manufacturing methods such as casting or machining. It has been found that making the serrated surface from metal sheet or shim stock, which generally come with sharp edges, joined together by diffusion bonding, which automatically produces zero radius "valleys" is an economically sound method.

Figure 4A:
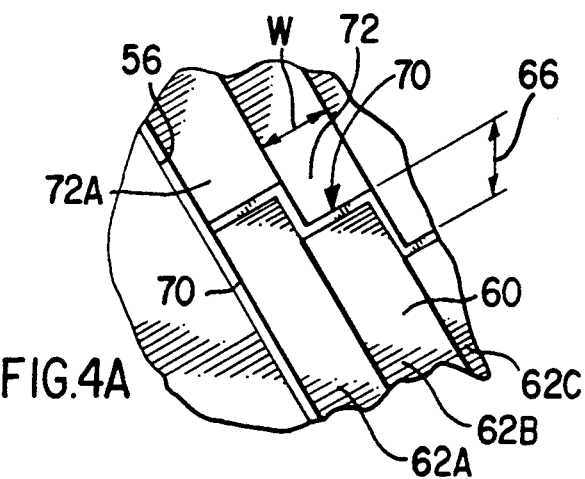
FIG. 4A is an enlarged partial view of FIG. 4 enclosed by the circle, indicated by numeral 4A.
Figure 4:
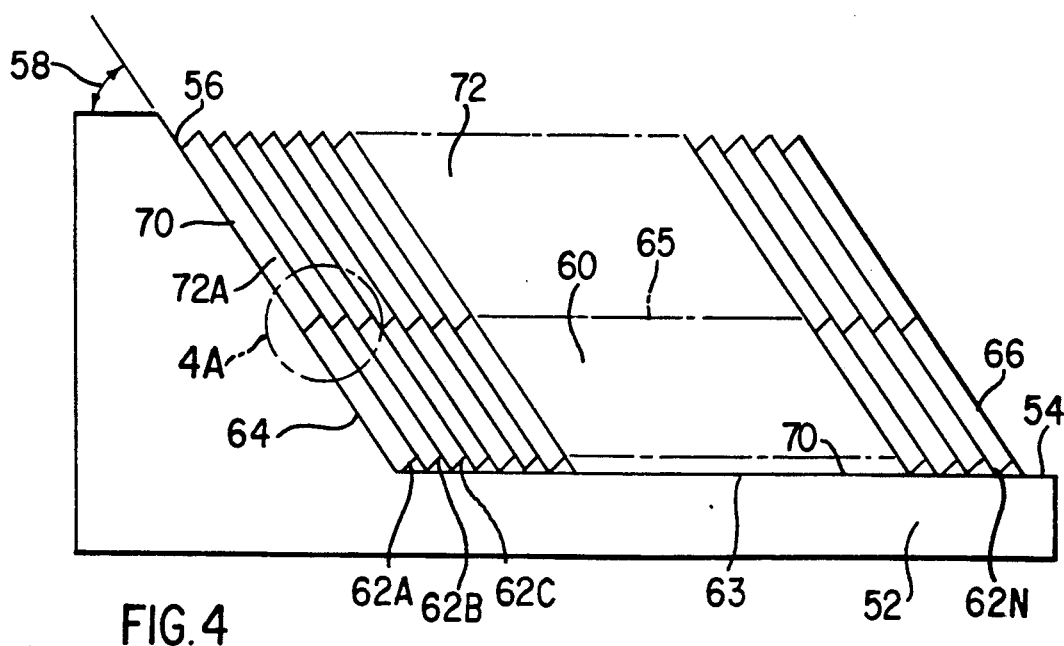
FIG. 4 is a side elevation view of a platen having stacks of individual sheets of material laid up thereon for subsequent joining to form a portion of the bottom wall of the duct shown in FIG. 3.

For example, illustrated in FIG. 4 is a side elevation view of a platen, while illustrated in FIG. 4A is an enlarged view of a portion of FIG. 4, within the circle indicated by alpha-numeral 4A. The platen, indicated generally by numeral 52, includes a flat forming surface 54, having a straight line inclined surface 56 at one end with an angle 58 to the surface 54. The actual angle 58 will be a function of the type and size of duct 10 shown in FIG. 1 and 2 or duct 40 shown in FIG. 3.

A stack 60 of thin sheets 62A-62N is positioned directly on the platen 52 with the bottom 63 thereof resting on the surface 54 and side 64 butted against surface 56. As a result, the top of each sheet 62A-62N of the stack 60 is offset from the bottom of each of the sheets of the stack 60 resulting in a plurality of serrations. As will be subsequently discussed, the thickness of the individual sheets 62A-62N can vary in thickness. Top 65 of the stack 60, has a serrated like surface because the individual sheets 62A-62N are in a staggered relationship, which is a function of the angle of the inclined surface 56 with respect to the flat surface 54 of platen 52. Thus, the stagger 66 between the sheets and the thickness W of each individual sheet sets the form of each of the individual serrations as best seen in FIG. 4A.

It is necessary to accurately position the individual sheets 62A-62N in the stack 60, because the serrations are typically very small and the individual sheets are correspondingly thin. Thus, the individual sheets can be laid up using automated tape laying machines employing sheet stock on spools. After each sheet is laid down, it can be tack-welded in place to the preceding sheet and cut to length. Other well known methods can be used: it is only important that the sheets be accurately positioned and do not move during the subsequent diffusion bonding step. This method has provided acceptable parts. A coating 70 of material to prevent diffusion bonding is applied to the surfaces 54 and 56 of the platen 52 and to the side 65 (FIG. 4A) of the stack 60, commonly called a "stop-off" coating. A typical stop-off coating is made from Boron Nitride and many such coatings are commercially available.

Subsequent stacks, 72, for example, are thereafter laid up and coated in a similar fashion with the staggered or serrated top side 65 of the stack 60 acting as a guide. For example, sheet 62A acts as a guide for sheet 72A.

Figure 5:
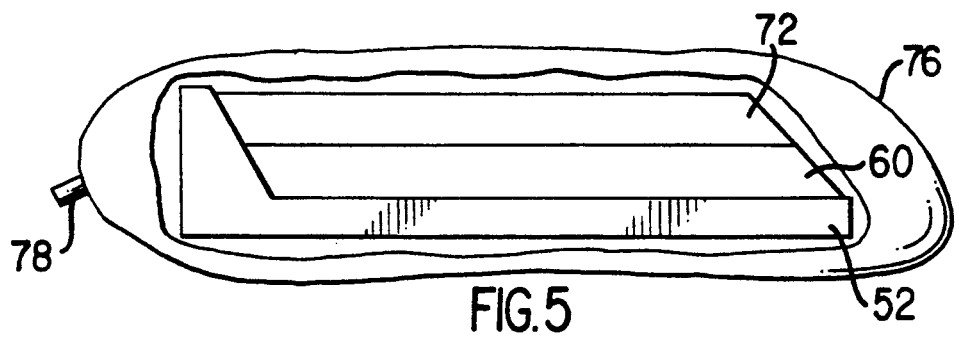
FIG. 5 is a side elevation view of the platen shown in FIG. 4 installed in a vacuum bag for diffusion bonding of stacked sheets of material.

Thereafter, as illustrated in FIG. 5, the platen 52, with assembled stacks 60 and 72 thereon, is placed within a metal foil bag 76 and sealed therein. A vacuum is drawn via tube 78 and the assembly is placed in an autoclave (not shown) wherein the pressure and temperature are raised to a level where diffusion bonding takes place. The temperature and pressure are returned to ambient and the bag is opened. Of course, other conventional diffusion bonding techniques can be used, such as placing the platen and stack assembly in a heated press. After the stacks 60, 72 have been diffusion bonded they are separated and used as segments to form the top, bottom and sides of ducts such as shown in FIG. 3.

Figure 6:
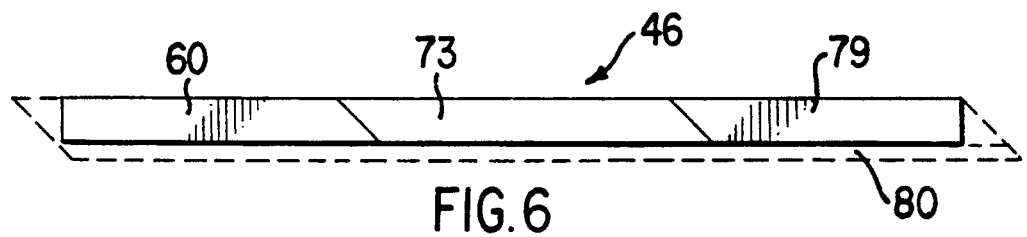
FIG. 6 is a side elevation view of the bottom wall of the duct shown in FIG. 3 from the diffusion bonded stacked sheets of material.

Illustrated in FIG. 6 is a bottom wall 46 (best seen in FIG. 3) formed by joining diffusion bonded stack 60 with other stacks, 73, and 79 and trimming of excess material, indicated by numeral 80. The joining may be accomplished by a wide variety of processes, for example, electron beam or laser welding or brazing before trimming.

Figure 7:
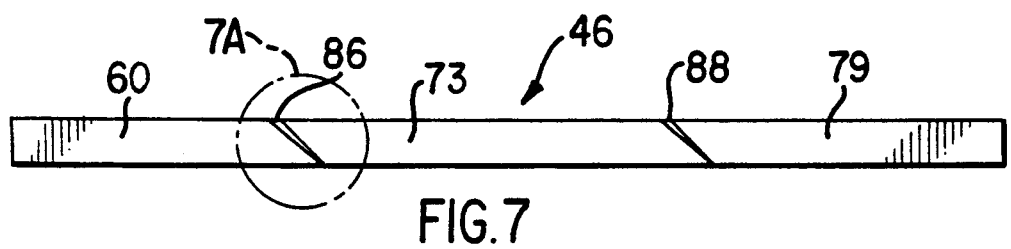
FIG. 7 is a side elevation view of the bottom wall of the duct shown in FIG. 3, similar to FIG. 6, having shims installed between joined diffusion bonded stacks such that the serrations from stack to stack along the wall and can be varied.
Figure 7A:
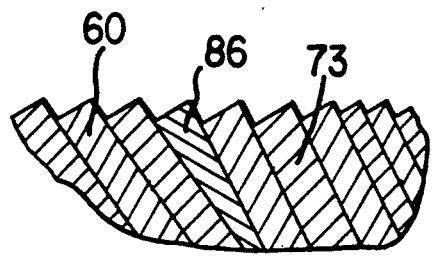
FIG. 7A is an enlarged view of a portion of FIG. 7 enclosed by the circle, indicated by numeral 7A.

As previously discussed, ideally, it is best to vary the serrations along the duct. While not providing continuous variation along the duct, by joining stacks with different staggers and thickness via tapered shims, does improve performance. Thus, illustrated in FIG. 7 is a bottom wall, generally indicated by numeral 46, and illustrated in FIG. 7A is an enlarged view of a portion of FIG. 7 encircled by numeral 7A. Here it can be seen that diffusion bonded stack 60 is joined to a diffusion bonded to stack 73 via a shim 86 and the stack 73 in turn abuts stack 79 via shim 88.

Figure 8:
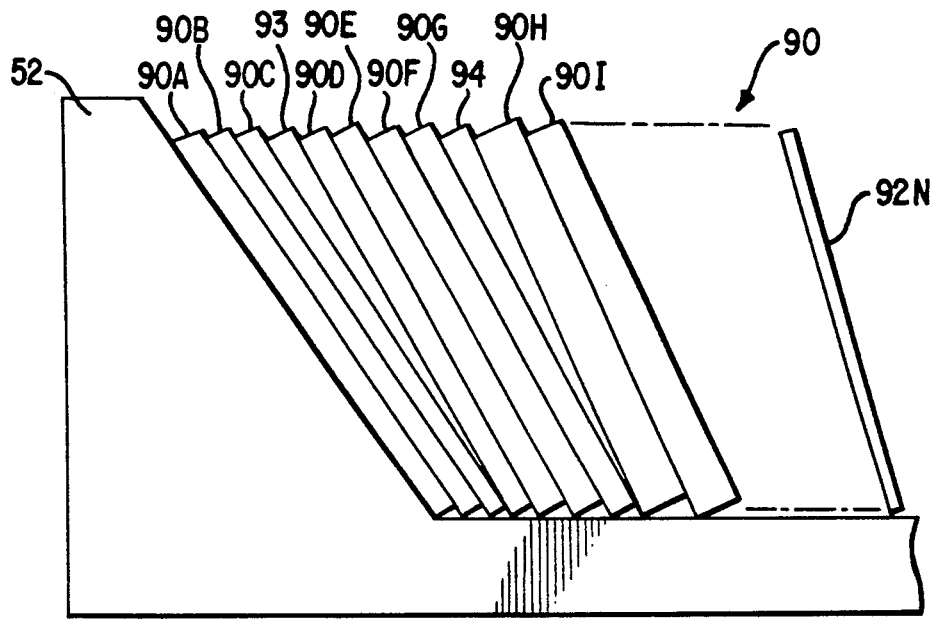
FIG. 8 is a partial view of the platen shown in FIG. 4, illustrating a method of forming a stack of sheet material with tapered shims installed along the stack so that serrations can be varied within an individual stack.

Of course, the shims can be incorporated into the stacks during the step of diffusion bonding. For example, illustrated in FIG. 8 is a partial view of platen 52 having a stack generally indicated at 90, installed thereon. The individual sheets 92A-92N vary in thickness along the length of the stack 90. For example, sheets 92A-92C, which each have the same thickness, vary in thickness from sheets 92D-92G and are separated by a shim 93. Sheets 92D-92G are separated from sheets 92H-92I by tapered shim 94 and each set of sheets again have a different thickness. By adding additional shims and varying the thickness of the sheets, individually or in sets of sheets, almost continuously varying serrations can be formed. In fact, each individual sheet could both vary in thickness as well as taper. The tapering of the sheets could be accomplished by passing the sheet stock through tapered rollers prior to lay up on the platen.

Figure 9:
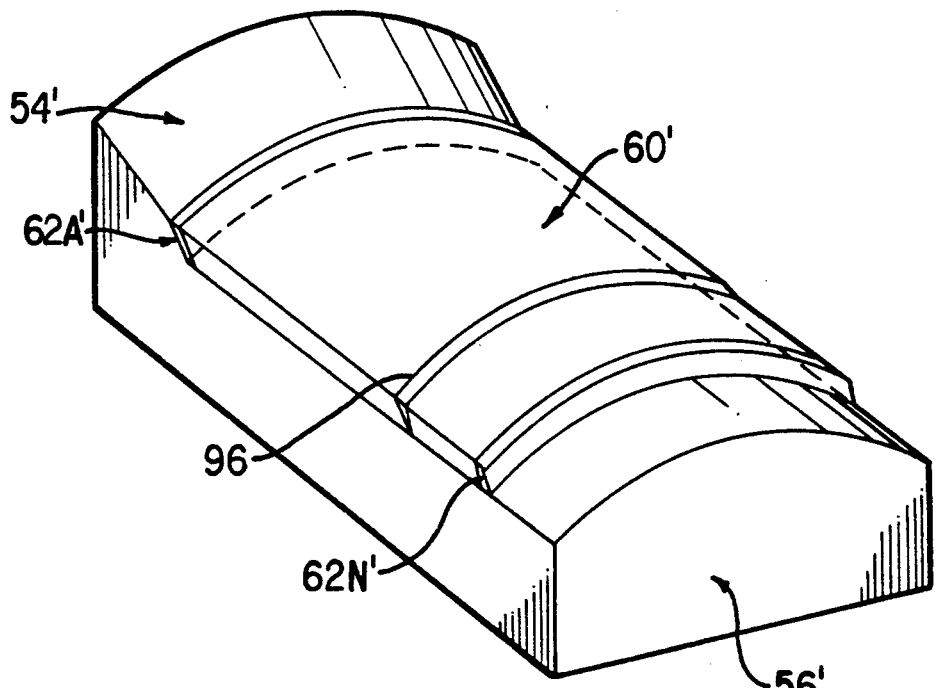
FIG. 9 is a perspective view of a platen and stacked sheets of material that can be diffusion bonded into curved surfaces that can be used for a portion of the wall of the duct shown in FIG. 1 and 2.

It must also be noted that curved diffusion bonded stacks that can be subsequently joined together to form circular shaped ducts such as illustrated in FIGS. 1 and 2A-2B. As illustrated in FIG. 9, a platen 56' having a curved support surface 54' can be used to form molding a curved stack 60' comprising individual sheets 62A'-62N'. Such a stack can also incorporate tapered shims 96 so that the serrations can be varied along the length of the stack. It must again be noted that a simple sheet having the contour of the duct will not work. This is because the plane of the sheets vary along the circumference of such a duct in order to maintain a prescribed angle with respect to the axis of the duct and thus, the "stagger" between sheets remains constant along the periphery thereof. The steps of diffusion bonding, trimming and joining the diffusion bonded stacks together are similar to the previous examples.

Because the flat diffusion bonded stacks, such as stack 60, are very thin, it is a simple matter to form them into curved panels by conventional forming techniques. It has been found that hydro-forming with water is particularly effective because no damage to the serrations occurs.

While the above process has been directed at a method of making metal serrated surfaces by diffusion bonding the process can easily be adapted to non-metallic materials such as ceramics or organic resin composites. For example, if the sheets were composite materials, they could be coated with an adhesive prior to stacking. After stacking, conventional vacuum bag-/autoclave forming techniques could be employed to cure the adhesive at temperature and under pressure.

Care must be taken to insure that the adhesive does not "run out" between the sheets, eliminating the necessarily small allowable radius in the valleys between serrations. Of course, if the surfaces are not required to withstand extremely high temperatures, an adhesive could also be used with metal sheets.

Up to now, the description has been directed at making a serrated surface for actual use on an internal or external surface; however, due to the effectively zero radius corners which result from developing such surfaces from stacked sheets, this surface can also serve as a mold or platen for making serrated surfaces therefrom. For example, the completed serrated surface in the form of bottom wall 46 can be covered with a liquid resin that is thereafter allowed to cure. The resin could also be applied in a semi-liquid or paste form and rolled into the serrations. Pre-preg composite materials can be laid up thereon, the assembly vacuum bagged, and thereafter cured at temperature and under pressure in an autoclave. All these methods, as well as numerous others can be used to produce films having serrated surfaces. These films can then be applied to any desired structure. In fact, the serrated surfaces manufactured using stacked sheets bonded together in any of the processes described above can also be used on external surfaces.

While the invention has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

I claim:

1. A method of making a structure having a plurality of serrations with effectively zero radius internal and external corners on a surface, each serration positioned in a specific location along the surface and having first and second sides with specific lengths, the method comprising the steps of:

providing a plurality of sheets of material having opposed principle surfaces, each said sheet having a thickness equal to the specific length of one of the first sides of the serrations;

stacking said plurality of sheets of material in a staggered relationship such that said thicknesses of said sheets of material are in an order corresponding to the order of the lengths of the first sides of the serrations and the distance between adjacent ends of said sheets of material are in an order corresponding to the length of the second sides of the serrations; and joining said stacked plurality of sheets of material together forming a joined stack with at least one end having a serrated surface thereon;

wherein said step of stacking said sheets of material includes stacking sets of sheets of different thickness with tapered shims between said sets such that said distance between adjacent ends can be varied.

2. The method as set forth in claim 1 wherein said sets of sheets of material includes at least one sheet of material.

3. The method as set forth in claim 1, wherein said sheets of material differ in thickness and are tapered so as to produce continuously varying serrations.

4. The method as set forth in claim 1, wherein said sheets of material are metal and said step of joining is accomplished by diffusion bonding.

5. The method as set forth in claim 4 wherein said step of stacking said sheets of material includes the steps of:

providing a platen with a first forming surface and a second inclined surface extending upward from one end of said surface of said platen; and stacking said sheets of material in contact with each other on said platen such that said sheets of material have their one ends mounted on said first forming surface and their principal sides inclined thereto.

6. The method as set forth in claim 5 wherein step of diffusion bonding includes the steps of:

enclosing and sealing said platen and said stacked sheets of material thereon within a metal foil bag;

forming a vacuum within said sealed bag; and heating said bag with said platen and stacked sheets therein to diffusion bonding temperatures and applying pressure sufficient to diffusion bond said stack.

7. The method as set forth in claim 6 including the step of forming the end opposite said serrated surface of said joined stack so that the surface thereof is parallel to an imaginary plane passing through the tips of the serrations on the one end.

* * * * *